Patented June 29, 1954

2,682,521

UNITED STATES PATENT OFFICE 2,682,521

RESINOUS, LINEAR POLYMERIC AMIDOPHOSPHONATES

Harry W. Coover, Jr., Kingsport, Tenn., assignor to Eastman Kodak Company, Rochester, N. Y., a corporation of New Jersey No Drawing. Application September 10, 1952, Serial No. 308,926

12 Claims. (Cl. 260—47)

This invention relates to resinous, linear polymeric N,N-dialkyl- and N,N-diarylamidophosphonates, and to a process for their preparation.

I have made the important discovery that when N,N-dialkyl or N,N-diarylamidophosphonyl dichlorides are heated with certain dihydroxy aromatic compounds, in the presence of a condensation catalyst, hydrogen chloride is liberated in the ensuing reaction and high molecular weight linear polymers are formed which are resinous polyphosphonates comprising the recurring structural unit

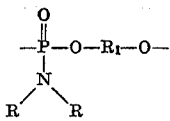

wherein R represents an alkyl group containing from 1 to 4 carbon atoms, a phenyl group, a tolyl group, a benzyl group, a cyclopentyl group or a cyclohexyl group and $R_1$ represents an aromatic nucleus such as benzene nucleus, a diphenyl nucleus, a diphenyl sulfone nucleus, a naphthalene nucleus, etc. The above defined resins are valuable materials for the preparation of fibers, films, coating compositions, molding compositions, and the like.

It is, accordingly an object of the invention to provide a new class of resinous, linear polyphosphonates containing a substituted amido group attached to each phosphorus atom. Another object is to provide a process for preparing such resinous products. Other objects will become apparent hereinafter.

In accordance with my invention, I prepare the new class of resins represented by the linearly recurring structural unit

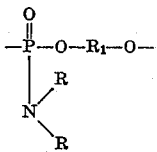

wherein R and $R_1$ have the previously defined meanings, by heating in the presence of an anhydrous alkaline-earth halide condensation catalyst (e. g. calcium chloride, zinc chloride, barium chloride, etc., but especially anhydrous magnesium chloride) a mixture comprising approximately equimolar proportions of a dihydroxy aromatic compound and an N,N-substituted amidophosphonic acid dichloride having the general formula:

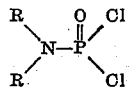

wherein R is as previously defined, at a temperature of from 90°–400° C., preferably from 150° to 260° C., until the condensation reaction is substantially complete. The amount of catalyst can vary from 0.1 to 3.0 per cent or even higher, based on the weight of the reactants. Mixtures in any proportions of one or more of the dihydroxy aromatic compounds with molecularly equivalent amounts of one or more of the said phosphonic acid dichlorides can be employed. Advantageously, the reaction temperature is gradually raised with stirring to approximately 200°–230° C., the hydrogen chloride that forms being, if desired, swept out with a dry inert gas such as dry nitrogen, and then vacuum is applied gradually while the temperature is raised further to a final temperature of 250° C. or higher. This procedure promotes completion of the reaction and ensures the rapid and complete elimination or substantially complete elimination of the evolved hydrogen chloride so that relatively pure polymeric products result. The technique of partial addition of the N,N-disubstituted amidophosphonic acid dichloride to the full amount of the dihydroxy aromatic compound and heating to an intermediate temperature of about 90°–130° C., followed by addition of the remainder of the said phosphonic acid dichloride and continuing the reaction as above described to completion, can also be employed with advantage. In the process as described, the condensation takes place in the proportion of one mole of the dihydroxy aromatic compound to each mole of the N,N-disubstituted amidophosphonic acid dichloride.

Suitable dihydroxy aromatic compounds which can be employed in the practice of my invention include resorcinol catechol, hydroquinone, dihydroxy toluenes, dihydroxyxylenes, dihydroxydiphenyls such as p,p'-hydroxydiphenyl, dihydroxydiphenyl sulfones, etc. The amidophosphonic acid dichlorides employed in the invention include N,N-dimethylamidophosphonyl dichloride, N,N-diethylamidophosphonyl dichloride, N,N-dipropylamidophosphonyl dichloride, N,N' - dibutylamidophosphonyl dichloride, N-methyl - N - ethylamidophosphonyl dichloride, N,N-diphenylamidophosphonyl dichloride, N,N-ditolylamidophosphonyl dichloride, dibenzylamidophosphonyl dichloride, N,N-dicyclohexylamidophosphonyl dichloride, and the like.

The following examples will serve further to illustrate my new class of resinous polyamidophosphonates and the manner of their preparation.

*Example 1*

A mixture of 55. g. (0.05 mole) of hydroquinone, 8.26 g. (0.051 mole) of N,N'-dimethylamidophosphonyl dichloride and 0.1 g. of anhydrous magnesium chloride was stirred slowly while the temperature was gradually raised to 205° C. over a period of 4 hours. Dry nitrogen was bubbled into the reaction mixture to help remove the hydrogen chloride that was formed and to facilitate the stirring. After the reaction mixture had become quite viscous (2–3 hours), the pressure was slowly reduced to 5.0 mm. and maintained while the stirring and heating were continued for 4 more hours. The final temperature was about 230° C. The polymeric material at this point was of such high viscosity that stirring was difficult. The light amber-colored polymeric material was a tough, rubbery, flameproof material. It dissolved slowly in dimethylformamide forming a clear, jelly-like mass.

In place of the hydroquinone in the above example, there can be substituted an equivalent amount of any other of the mentioned dihydroxy aromatic compounds such as resorcinol, p,p'-dihydroxyphenyl, p,p'-dihydroxydiphenyl sulfone, etc. to give similar polyphosphonates.

Example 2

A mixture of 0.05 mole of hydroquinone, 0.051 mole of N,N-diphenylamidophosphonyl dichloride and 0.1 g. of anhydrous magnesium chloride was stirred slowly while the temperature was gradually raised to 225° C. over a 4 hour period. Dry nitrogen was bubbled into the reaction mixture to help remove the hydrogen chloride that was formed and to facilitate the stirring. After the reaction mixture had become quite viscous, the pressure was slowly reduced to 5 mm. and maintained while the stirring and heating was continued for 4 or more hours. The final temperature was about 230° C. The resultant polymer was a hard, tough, flameproof material. It was soluble in such solvents as dimethylformamide. The polymer could be injection molded to give hard, tough, non-inflammable shaped objects.

Example 3

A mixture of 0.05 mole of resorcinol, 0.051 mole of N,N-dicyclohexylamidophosphonyl dichloride and 0.1 g. of anhydrous magnesium chloride was stirred slowly while the temperature was raised to 205° C. over a period of 4 hours. Dry nitrogen was bubbled into the reaction mixture to help remove the hydrogen chloride and to facilitate the stirring. After the reaction mixture became quite viscous, the pressure was slowly reduced to 1–2 mm. and maintained while the stirring and heating were continued for an additional 3 hours. Final temperature was about 250° C. The polymeric material at this stage of the reaction had such a high viscosity that stirring was difficult. The light amber-colored polymer was a hard, tough, flameproof material which could be readily injection molded or extruded into fibers.

Example 4

A mixture of 0.05 mole of hydroquinone, 0.05 mole of p,p'-dihydroxydiphenylsulfone, 0.11 mole of N,N-diethylamidophosphonyl dichloride was stirred while the temperature was gradually raised to 205° C. over a period of 4 hours. Dry nitrogen was bubbled into the reaction mixture to remove the hydrogen chloride that formed and to facilitate the stirring. After the reaction mixture had become quite viscous, the pressure was slowly reduced to 1–2 mm. and maintained while the stirring and heating were continued for an additional 4 hours. Final temperature was about 250° C. The light amber-colored polymer obtained was a hard, tough, flameproof material which could be readily extruded or injection molded. The polymer comprised in combination the recurring structural units

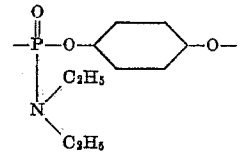

and

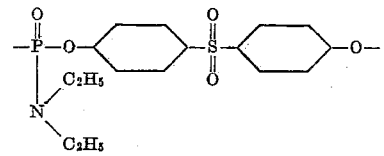

In place of the hydroquinone in the above example, there can be substituted an equivalent amount of p,p'-dihydroxydiphenyl sulfone so that the resultant polymer comprises only the recurring structural unit.

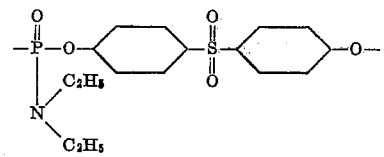

Example 5

A mixture of 0.5 mole of p,p'-dihydroxydiphenyl, 0.25 mole of N-methyl-N-ethylamidophosphonyl dichloride, 0.26 mole of benzenephosphonic acid dichloride and 0.1 g. of anhydrous magnesium chloride was stirred slowly while the temperature was gradually raised to 225° C. over a 3 hour period. Dry nitrogen was bubbled into the reaction mixture to help remove the liberated hydrogen chloride and to facilitate the stirring. After the reaction mixture became quite viscous, the pressure was slowly reduced to 5 mm. and maintained while the stirring and heating were continued for an additional 4 hours. Final reaction temperature was approximately 240° C. The resultant polymer at normal temperature was a hard, tough, light amber-colored material which could be readily extruded or injection molded. The polymer comprised in combination the recurring structural units:

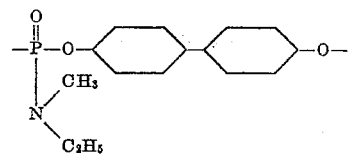

and

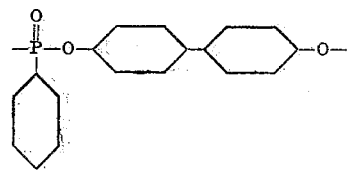

Example 6

A mixture of 0.1 mole of hydroquinone, 0.025 mole of benzenephosphonyl dichloride, 0.025 mole of N,N-dimethylamidophosphonyl dichloride and 0.1 g. of anhydrous magnesium chloride was stirred slowly while the temperature was raised gradually to 90° C. and maintained for one hour. Dry nitrogen was bubbled into the reaction mixture to help remove the hydrogen chloride that was formed and to facilitate the stirring. Care was taken not to distill out any of the low molecular weight material or unreacted phosphonyl dichlorides. The temperature after 3 hours was 120° C. At this point, 0.025 mole more benzenephosphonyl dichloride and 0.026 mole more N,N-dimethylamidophosphonyl dichloride were added. After the reaction mixture became viscous again. The pressure was gradually reduced so that the hydrogen chloride might be removed more rapidly and completely. The vacuum was gradually increased until a pressure of 1-2 mm. and a temperature of 250° C. was obtained. After the evolution of hydrogen chloride had practically stopped (5-8 hours), a clear amber-colored product was obtained. At room temperature, it was a hard, tough, flameproof material. The polymer comprised in combination the recurring structural units:

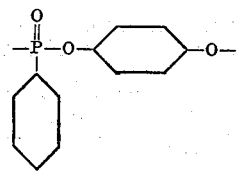

and

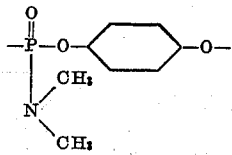

By proceeding as set forth in the preceding examples, other resinous linear polyamidophosphonates of the invention can be prepared employing any of the mentioned dihydroxy aromatic compounds and any of the mentioned N,N-disubstituted amidophosphonic acid dichlorides. At their melting points, all of the resins above defined and illustrated form clear, viscous masses which can be readily injection molded or extruded into fibers, films, etc., having remarkable properties. In general, at ordinary temperatures they are hard, tough materials having softening points in the range of 100°-130° C., and are non-inflammable. The higher molecular weight members are not readily soluble in common solvents; however, many of them are readily soluble in such solvents as dimethylformamide, dimethylacetamide, etc., at room temperature. The lower molecular weight members are readily soluble in such solvents as acetone and ethylene chloride. Compositions of the polymeric products for extrusion, molding or coating purposes may have incorporated therein, if desired, various other materials such as fillers, dyes, sizing materials, and the like. Mixtures of the various polymers of the invention can be employed for the above purposes.

What I claim is:

1. A resinous, linear polymeric amidophosphonate comprising the recurring strucural unit

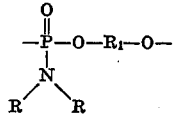

wherein R represents a member selected from the group consisting of an alkyl group containing from 1 to 4 carbon atoms, a phenyl group and a cyclohexyl group and $R_1$ represents an aromatic group selected from the group consisting of a phenylene group, a diphenylene group and a diphenylene sulfone group.

2. A resinous, linear polymeric amidophosphonate comprising the recurring structural unit

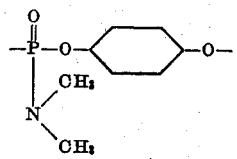

3. A resinous, linear polymeric amidophosphonate comprising the recurring structural unit

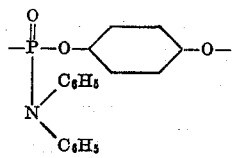

4. A resinous, linear polymeric amidophosphonate comprising the recurring structural unit

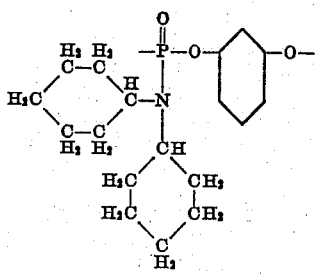

5. A resinous, linear polymeric amidophosphonate comprising the recurring structural unit

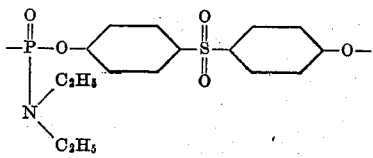

6. A resinous, linear polymeric amidophosphonate comprising in linear combination the recurring structural units

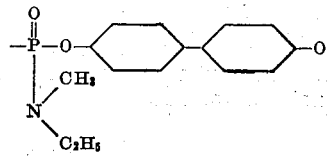

and

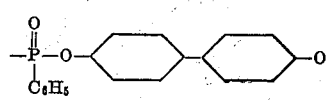

7. A process for preparing a resinous, linear polymeric amidophosphonate comprising the recurring structural unit

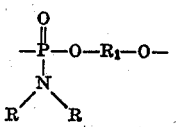

where R represents a member selected from the group consisting of an alkyl group containing from 1 to 4 carbon atoms, a phenyl group and a cyclohexyl group and $R_1$ represents an aromatic group selected from the group consisting of a phenylene group, a diphenylene group and a diphenylene sulfone group, which comprises heating in the presence of an anhydrous alkaline-earth halide condensation catalyst a mixture comprising equimolar quantities of a dihydroxy aromatic compound selected from the group consisting of a dihydroxybenzene, a dihydroxydiphenyl and a dihydroxydiphenylsulfone, and an amidophosphonic acid dichloride having the general formula:

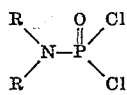

wherein R has the above definition, at a temperature of from 90° to 400° C., until the condensation reaction is substantially complete.

8. A process for preparing a resinous, linear polymeric amidophosphonate comprising the recurring structural unit

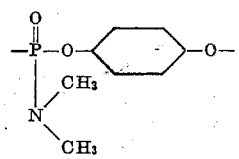

which comprises heating in the presence of anhydrous magnesium chloride a mixture comprising approximately equimolar quantities of hydroquinone and N,N-dimethylamidophosphonyl dichloride, at a temperature of from 150° to 260° C., until the condensation reaction is substantially complete.

9. A process for preparing a resinous, linear polymeric amidophosphonate comprising the recurring structural unit

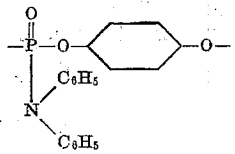

which comprises heating in the presence of anhydrous magnesium chloride a mixture comprising approximately equimolar quantities of hydroquinone and N,N-diphenylamidophosphonyl dichloride, at a temperature of from 150° to 260° C., until the condensation reaction is substantially complete.

10. A process for preparing a resinous, linear polymeric amidophosphonate comprising the recurring structural unit

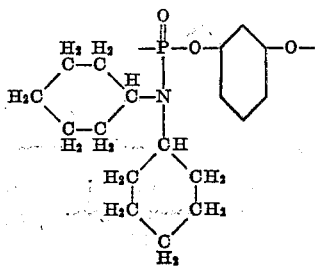

which comprises heating in the presence of anhydrous magnesium chloride a mixture comprising approximately equimolar quantities of resorcinol and N,N-dicyclohexylamidophosphonyl dichloride, at a temperature of from 150° to 260° C., until the condensation reaction is substantially complete.

11. A process for preparing a resinous, linear polymeric amido phosphonate comprising the recurring structural unit

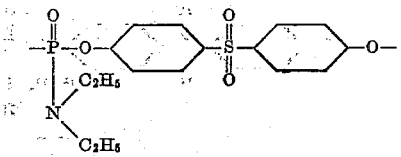

which comprises heating in the presence of anhydrous magnesium chloride a mixture comprising approximately equimolar quantities of p,p'-dihydroxydiphenyl sulfone and N,N-diethylamidophosphonyl dichloride, at a temperature of from 150° to 260° C., until the condensation reaction is substantially complete.

12. A process for preparing a resinous, linear polymeric amidophosphonate comprising in linear combination the recurring structural units

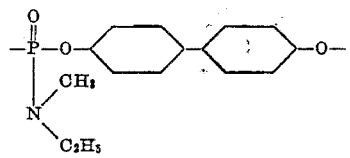

and

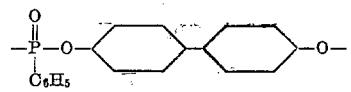

which comprises heating in the presence of anhydrous magnesium chloride p,p'-dihydroxydiphenyl with a molecularly equivalent amount of a mixture of N-methyl-N-ethylamidophosphonyl dichloride and benzenephosphonic acid dichloride, at a temperature of from 150° to 260° C., until the condensation reaction is substantially complete.

References Cited in the file of this patent

UNITED STATES PATENTS

| Number | Name | Date |
|---|---|---|
| 2,435,252 | Toy | Feb. 3, 1948 |